(12) United States Patent
Kesselgruber

(10) Patent No.: US 7,549,501 B2
(45) Date of Patent: Jun. 23, 2009

(54) STEERING SYSTEM AND A METHOD FOR CONTROLLING A VEHICLE

(75) Inventor: Dirk Kesselgruber, Köln (DE)

(73) Assignee: TRW Automotive GmbH (DE)

( * ) Notice: Subject to any disclaimer, the term of this patent is extended or adjusted under 35 U.S.C. 154(b) by 357 days.

(21) Appl. No.: 10/924,761

(22) Filed: Aug. 24, 2004

(65) Prior Publication Data

US 2005/0087385 A1    Apr. 28, 2005

(30) Foreign Application Priority Data

Aug. 25, 2003   (DE) ................................ 103 38 998

(51) Int. Cl.
*B62D 5/00* (2006.01)

(52) U.S. Cl. ................ 180/402; 180/443; 180/444; 180/446; 701/41; 701/42; 701/43

(58) Field of Classification Search ................ 180/402, 180/443, 444, 446; 701/41–43
See application file for complete search history.

(56) References Cited

U.S. PATENT DOCUMENTS

| | | | |
|---|---|---|---|
| 5,851,015 A * | 12/1998 | Klosterhaus | 280/93.51 |
| 5,957,987 A * | 9/1999 | Sudo et al. | 701/41 |
| 6,381,527 B1 * | 4/2002 | Furumi et al. | 701/41 |
| 6,505,703 B2 * | 1/2003 | Stout et al. | 180/446 |
| 6,510,917 B2 * | 1/2003 | Cole | 180/437 |
| 6,527,078 B1 * | 3/2003 | Nelson | 180/437 |
| 6,539,298 B2 | 3/2003 | Inagaki et al. | |
| 6,556,909 B2 | 4/2003 | Matsumoto et al. | |

FOREIGN PATENT DOCUMENTS

| | | |
|---|---|---|
| DE | 39 24 325 | 1/1991 |
| DE | 102 08 418 | 10/2002 |

\* cited by examiner

*Primary Examiner*—Lesley D. Morris
*Assistant Examiner*—Marlon A Arce Diaz
(74) *Attorney, Agent, or Firm*—MacMillan, Sobanski & Todd, LLC

(57) ABSTRACT

A steering system for a motor vehicle, including a steering gear and at least one tie rod, is characterized in that an actuator is provided, which can move an end section of the tie rod transversely to the direction in which the end section can be adjusted by the steering gear. A method of controlling a vehicle, in which steerable wheels of a vehicle are acted upon, is characterized in that a correction steering angle is superimposed on a steering angle of the steerable wheels which is given by a steering gear, which correction steering angle is brought about by an actuator which acts on one of the steerable wheels.

12 Claims, 2 Drawing Sheets

STEERING SYSTEM AND A METHOD FOR CONTROLLING A VEHICLE

CROSS REFERENCE TO RELATED APPLICATION

This application claims priority to German Application No. 103 38 998.9 filed Aug. 25, 2003, the disclosures of which are incorporated herein by reference.

BACKGROUND OF THE INVENTION

The invention relates to a steering system for a motor vehicle, comprising a steering gear and at least one tie rod. The invention further relates to a method of controlling a vehicle, in which steerable wheels of the vehicle are acted upon.

Usually in a steering system, two tie rods are provided, which respectively extend between the steering gear and a steerable wheel of the vehicle. The two tie rods are arranged such that a steering trapezoid is formed, which causes the wheel on the inner side of the curve to receive a greater steering turning angle than the wheel on the outer side of the curve. In this way, it is attempted to fulfill as far as possible the Ackermann condition when double-tracked vehicles drive around bends. Through the effect of the transverse acceleration on the vehicle, on driving around bends, however, a floating angle occurs, so that the Ackermann condition is no longer valid. The wheel positions are therefore no longer adapted optimally to the driving situation.

Independently of these problems, efforts are made in modern vehicles to have an active effect on the driving behavior of the vehicle. The steering is also suitable for this, because it is a quick-acting actuating member with regard to the transverse dynamics of a vehicle. Therefore, efforts are made to stabilize a vehicle by means of controlled steering actions, without perception on the part of the driver, and/or to improve the transverse dynamic behavior of the vehicle in terms of automatic control. A known solution in steering systems with mechanical connection between steering gear and steering wheel is a so-called superimposed steering, in which an additional gear is provided between the steering wheel and the steering gear. The gear is provided with an actuating member, so that a steering correction can be produced, which is superimposed on the steering movement given by the driver via the steering wheel. The disadvantage of this solution consists in that the additional gear is situated at the steering column in a region in which usually no space is available. Another solution consists in a steer-by-wire steering system, in which merely an information technical connection exists between steering wheel and steering gear. The desired steering correction can be calculated in a simple manner by a control unit and superimposed electronically with the steering angle given by the steering wheel. The disadvantage of such a system consists, of course, in the high costs, because with a view to the necessary failure safety, the actors, sensors and processors must be constructed so as to be redundant. The disadvantage of both systems consists in that the angle position of the steered wheels to each other can not be adapted.

SUMMARY OF THE INVENTION

The object of the invention consists in setting a steering angle correction for the two steered wheels independently of each other, by a simple, fail-safe system.

For this purpose, in accordance with the invention, in a steering system of the type initially mentioned an actuator is provided, which can move an end section of the tie rod transversely to the direction in which the end section can be adjusted by the steering gear. This makes it possible to set a steering correction angle for the wheel associated with the tie rod. The tie rod in fact usually extends obliquely both to the longitudinal direction of the vehicle and also to the transverse axis of the vehicle; the end section of the tie rod is adjusted by the steering gear usually parallel to the transverse axis of the vehicle. The end section of the tie rod is therefore usually adjusted by the actuator parallel to the vehicle steering axis. This can take place at the steering knuckle of the corresponding wheel or, as is technically simpler to solve, at the connection between the tie rod and the steering gear. In each case, because the tie rod is oblique to the adjustment direction predefined by the actuator, the steering angle of the corresponding wheel is influenced.

A mechanically simple solution is presented by arranging the end section of the tie rod displaceably in a sliding guide. Between the actuator and the adjustable end section of the tie rod, preferably a self-locking gear is provided, so that the end section remains in its respective position in the case of a failure of the actuator. This leads to a high failure safety.

Basically it is possible to only provide a single actuator, which acts on a single tie rod. When in this case the steering angle of the wheel is to be corrected, with which the actuator is not associated, this would have to take place indirectly, in that the actuator produces a particular steering correction on which the exactly opposite steering movement from the steering gear is superimposed. Then the steering correction would have its effect on the wheel which is not provided with the adjustable tie rod. However, this solution presupposes that a steering movement independent of the steering wheel can be forced on the steering gear. In a steering system with a purely mechanically actuated steering gear, it is necessary for an actuator to be associated with each tie rod, in order to be able to set a steering correction individually for each wheel.

To solve the above-mentioned problem, a method is also provided of controlling a vehicle, in which a correction steering angle is superimposed on a steering angle of the steerable wheels, which is given by a steering gear, which correction steering angle is brought about by an actuator which acts on one of the steerable wheels. This makes it possible to influence the driving behavior of the vehicle in various ways. For example, the correction steering angle can be closed-loop controlled dynamically as a function of travel status quantities and manipulated variables of the driver. It is also possible to adjust the correction steering angle statically, for example to different drivers. In this case, no additional energy consumption results for the controlling of the actuator, because owing to the self-locking gear, a stable state is able to be set without action from the exterior. Finally, it is possible to closed-loop control the correction steering angle over the entire range of the steering angle such that an adaptive steering system is produced. This opens up the usual parameters for active influencing of the steering behavior, without the usually additionally necessary variable gear transmission having to be provided.

Other advantages of this invention will become apparent to those skilled in the art from the following detailed description of the preferred embodiment, when read in light of the accompanying drawings.

DETAILED DESCRIPTION OF THE INVENTION

Figure 1:
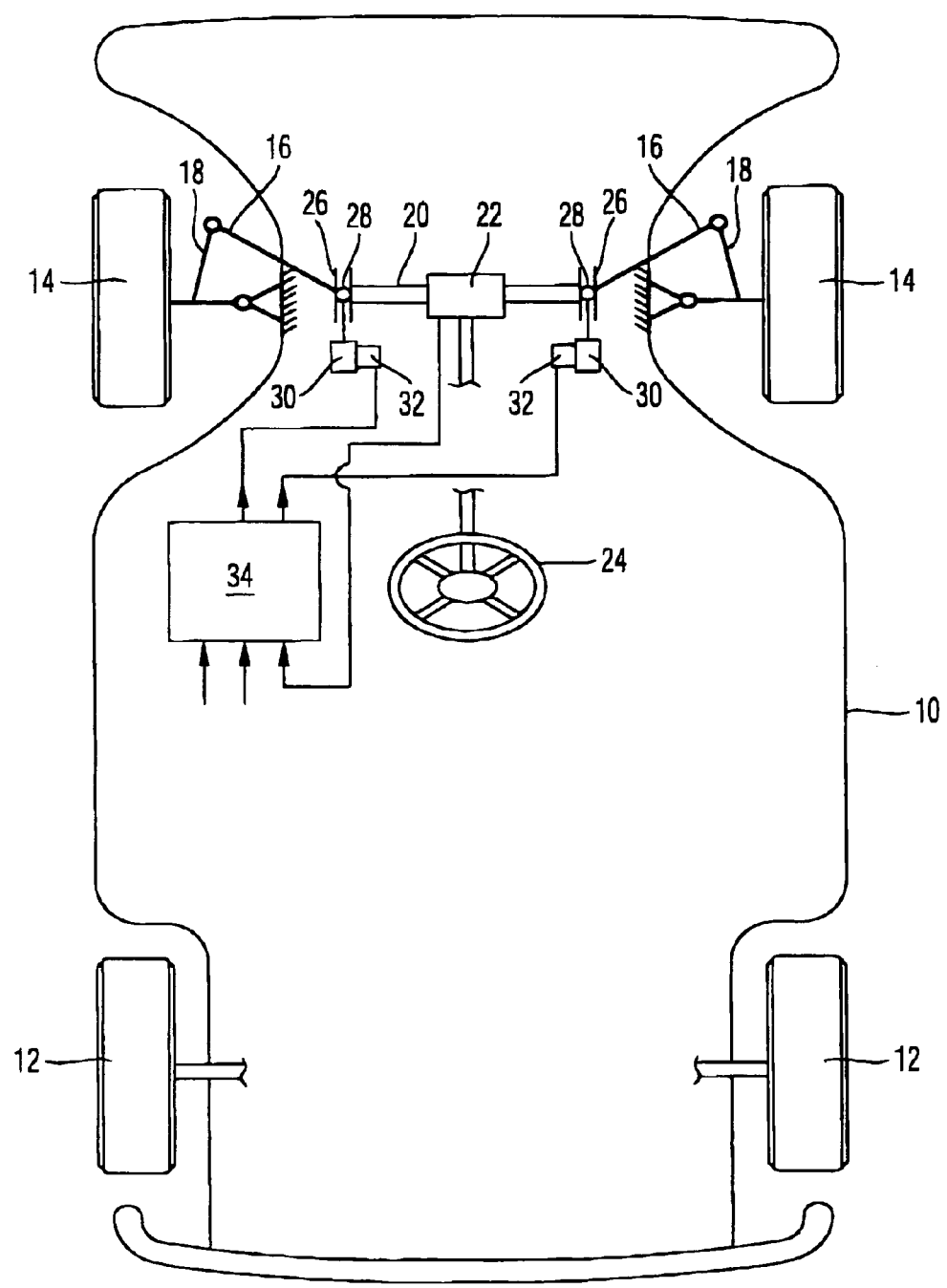
In FIG. 1 a vehicle is shown diagrammatically with a steering system according to the invention.
Figure 2:
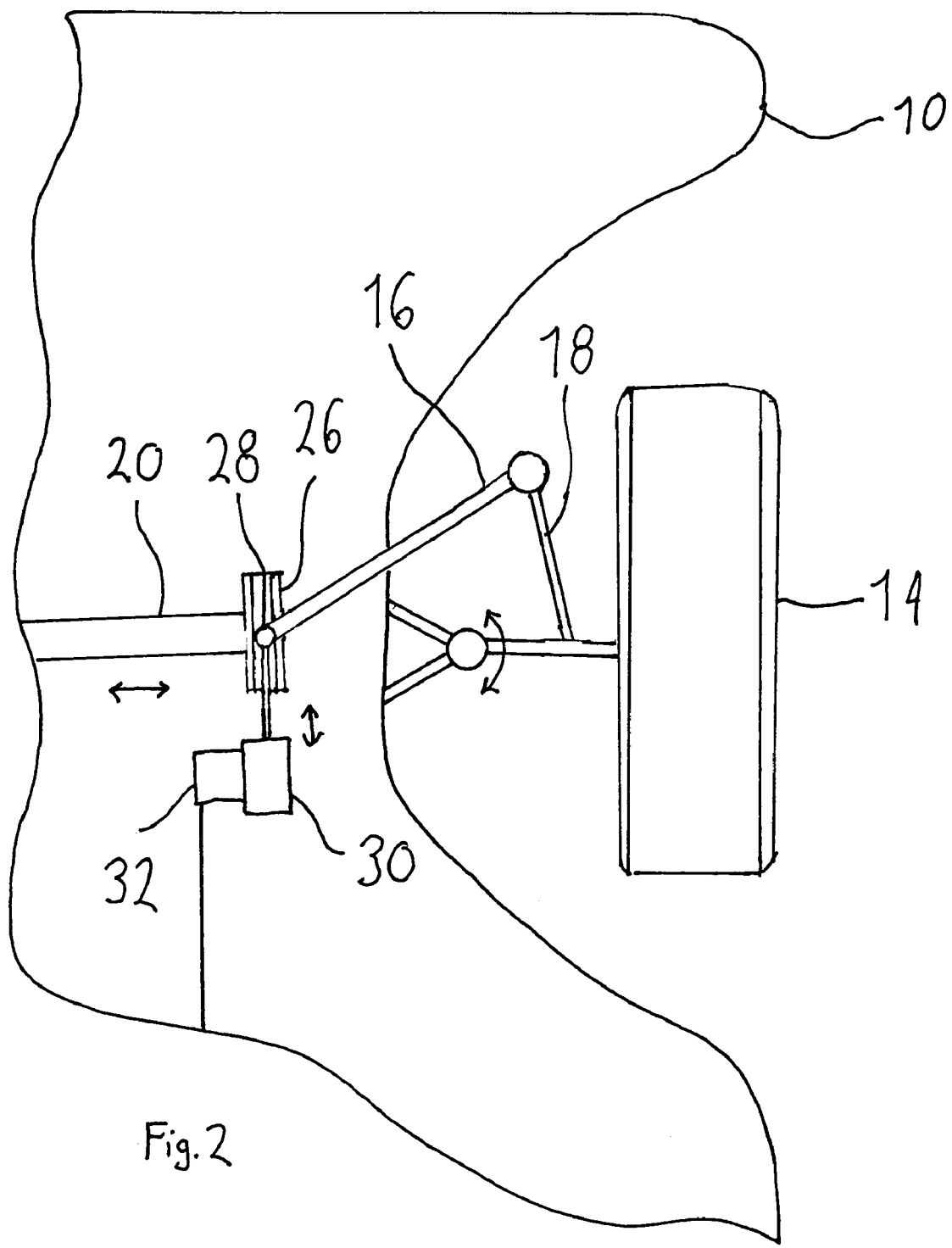

In FIG. 2, the right front steering mechanism shown in FIG. 1 is shown diagrammatically enlarged.

In FIG. 1 a vehicle 10 is illustrated diagrammatically, which has two rear wheels 12 and two steerable front wheels 14. For each steerable wheel 14 a tie rod 16 is provided, which extends between a steering knuckle 18, which is associated with the corresponding wheel 14, and one end of a working rod 20 which is part of a steering gear 22. This may, for example, be a rack steering, in which the steering gear 22 is actuated mechanically by a steering wheel 24.

As best shown in FIG. 2, at each end of the working rod 20, a sliding guide 26 is securely mounted, in which an end section 28 of the corresponding tie rod 16 is displaceably arranged. A self-locking gear 30, which is driven by an actuator 32, acts on each end section 28. In particular, the actuator can be an electric servo-motor. A hydraulic actuating cylinder is also alternatively possible.

The two actuators 32 are controlled by a control unit 34, which can receive as input signals for example the position of the steering gear 22 and also other information concerning the driving status (longitudinal acceleration, transverse acceleration, etc.) or information concerning the driver and his respective way of driving. As a function of this information, a respectively current steering correction angle is calculated, which is individual for each steerable wheel 14. This steering correction angle is forced on the corresponding wheel 14 in that the end section 28 of the corresponding tie rod 16 is displaced in the associated sliding guide 26. If, for example, it is recognized that a steering correction angle acting in a clockwise direction is to be imposed on the left wheel 14, the end section 28 is moved in the sliding guide 26 by the actuator 32 and the gear 30 to the rear with respect to the longitudinal axis of the vehicle.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A steering system for a motor vehicle, comprising a steering gear having a working rod and at least one tie rod, wherein an actuator, separate from the steering gear and working rod, is provided, which can move an end section of the tie rod transversely to the working rod; and wherein the end section is coupled with the steering gear.

2. The steering system according to claim 1, wherein the end section is displaceable in a sliding guide.

3. The steering system according to claim 1, wherein between the actuator and the end section of the tie rod a self-locking gear is arranged.

4. The steering system according to claim 1, wherein the actuator is a hydraulic actuating cylinder.

5. The steering system according to claim 1, wherein the actuator is an electric servo-motor.

6. The steering system according to claim 1, wherein an actuator is associated with each tie rod.

7. A method of controlling a vehicle, in which steerable wheels of the vehicle associated with a steering wheel are acted upon, wherein a correction steering angle is superimposed on a steering angle of the steerable wheels which is given by a steering gear having a tie rod with an end section and results from operation of a steering wheel, which correction steering angle is brought about by an actuator which acts on the end section of the tie rod such that the end section of the tie rod is moved transverse to its direction of movement caused by the steering wheel.

8. The method according to claim 7, wherein the correction steering angle is closed-loop controlled dynamically as a function of travel status quantities.

9. The method according to claim 7 wherein the correction steering angle is closed-loop controlled dynamically as a function of manipulated variables of the driver.

10. The method according to claim 7, wherein the correction steering angle is adjusted statically.

11. The method according to claim 7, wherein the correction steering angle is closed-loop controlled over the entire range of the steering angle such that an adaptive steering system is produced.

12. A steering system for a motor vehicle, comprising a steering gear having a working rod and at least one tie rod, wherein an actuator, separate from the steering gear and working rod, is provided, which can move an end section of the tie rod transversely to the working rod; and wherein the end section is associated with the steering gear.

* * * * *